United States Patent [19]
Lukowski, Sr.

[11] Patent Number: 6,106,916
[45] Date of Patent: *Aug. 22, 2000

[54] FLEXIBLE LAMINATED SHEET FLOORING PRODUCT

[75] Inventor: Robert W. Lukowski, Sr., Lancaster, Pa.

[73] Assignee: Skitech Partners, Salunga, Pa.

[*] Notice: This patent is subject to a terminal disclaimer.

[21] Appl. No.: 09/245,634

[22] Filed: Feb. 5, 1999

Related U.S. Application Data

[63] Continuation of application No. 08/853,677, May 9, 1997, Pat. No. 5,942,300.

[51] Int. Cl.⁷ .................................................. B32B 3/10
[52] U.S. Cl. .................... 428/40.1; 52/309.1; 52/390; 428/41.7; 428/42.1; 428/42.2; 428/47
[58] Field of Search .................. 428/40.1, 41.7, 428/42.1, 42.2, 47; 52/309.1, 390

[56] References Cited

U.S. PATENT DOCUMENTS

| | | |
|---|---|---|
| 2,696,447 | 12/1954 | Bezman . |
| 2,705,683 | 4/1955 | Hazeltine, Jr. et al. . |
| 2,739,082 | 3/1956 | Bezman et al. . |
| 3,135,647 | 6/1964 | Wheeley . |
| 3,442,730 | 5/1969 | Dietz . |
| 3,625,807 | 12/1971 | Beemer . |
| 4,114,346 | 9/1978 | Kelly . |
| 4,307,145 | 12/1981 | Goldman . |
| 4,680,209 | 7/1987 | Zybko et al. . |
| 4,990,399 | 2/1991 | Hoopengardner . |
| 5,102,714 | 4/1992 | Mobley et al. . |
| 5,217,552 | 6/1993 | Miyajima et al. . |
| 5,242,726 | 9/1993 | Pariseau et al. . |

*Primary Examiner*—Nasser Ahmad
*Attorney, Agent, or Firm*—Adams Law Firm, P.A.

[57] ABSTRACT

A flexible laminated sheet flooring product for covering a subfloor. The flooring product includes a resilient top layer defining a wearing surface of the flooring product. A fiber backing is laminated to the top layer for dimensionally supporting the layer. A pressure sensitive adhesive coating is permanently applied to the fiber backing and releasable from a protective covering without separation of the fiber backing from the top layer. The coating has sufficient tack for releasably adhering the flooring product to the subfloor.

8 Claims, 3 Drawing Sheets

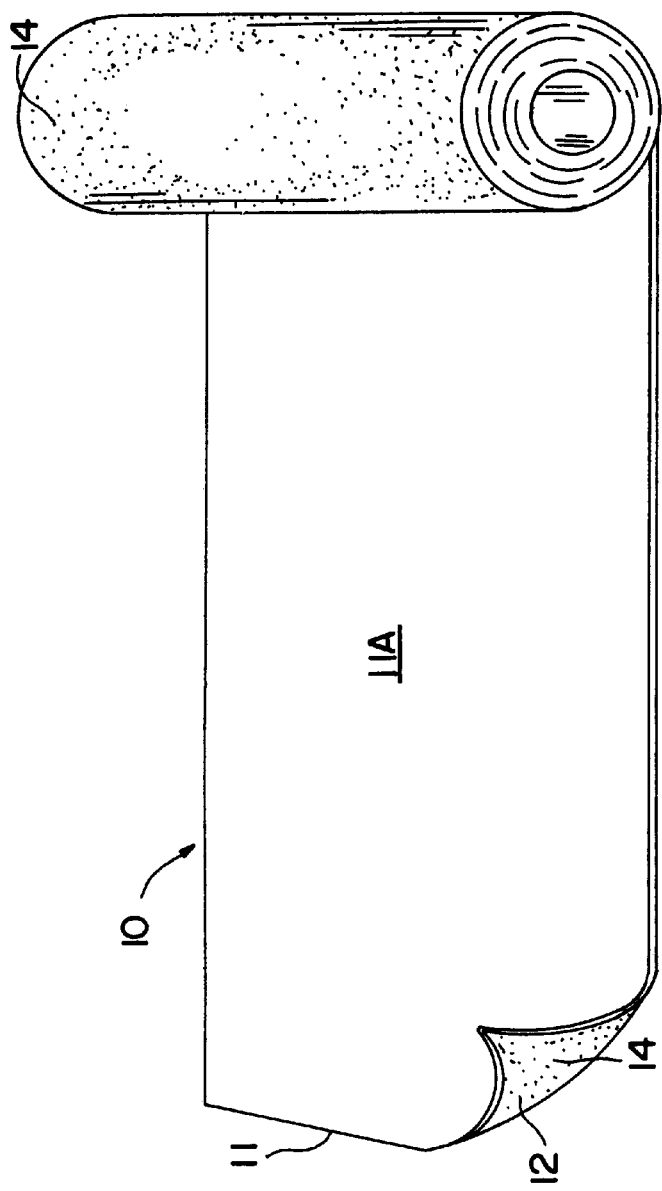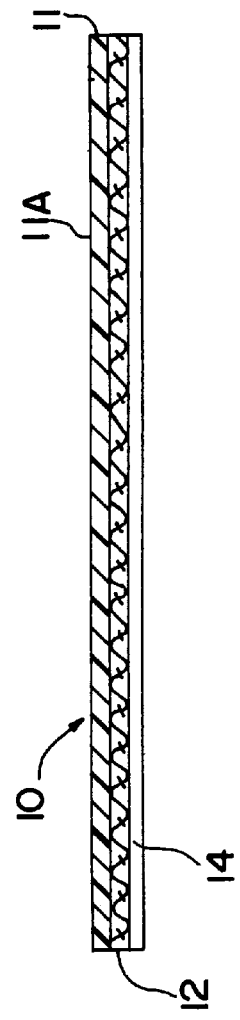

FLEXIBLE LAMINATED SHEET FLOORING PRODUCT

This application is a Rule 37 C.F.R. §1.53(b) Continuation Application of U.S. Ser. No. 08/853,677 filed on May 9, 1997. now U.S. Pat. No. 5,942,300.

TECHNICAL FIELD AND BACKGROUND OF THE INVENTION

This invention relates to a flexible laminated sheet flooring product. The invention includes a pre-applied tacky adhesive formulated to releasably bond the flooring product to the subfloor. The invention is easily installed and can be easily removed from the subfloor after installation without damaging the flooring product, and without adhesive separating from the flooring product and adhering to the subfloor. The invention further allows convenient repair of common subfloor problems, such as nail pops, squeaks, and ledging, which often occur after installation.

Present methods of installing resilient vinyl sheet flooring require first spreading a liquid adhesive over the subfloor using a trowel or other spreader device, and then laying the sheet flooring over the wet adhesive and subfloor. Bonding occurs as the water in the adhesive migrates outwardly around the flooring and evaporates. The resulting bond is permanent, and the flooring immovable and non-replaceable. Mildew staining, bottom-up staining from the subfloor, seam contamination, and vapor bubbles are common problems resulting from the use of a wet adhesive at the flooring installation site.

The present invention addresses these and other disadvantages of the prior art by providing a flexible resilient flooring product which is quickly and easily installed over a subfloor using a pre-applied, pressure sensitive tacky adhesive. The flooring product adheres to a variety of different subfloors, such as plywood, concrete, and existing vinyl flooring, and can be conveniently removed after installation without adhesive adhering to the subfloor and without damaging the flooring product.

SUMMARY OF THE INVENTION

Therefore, it is an object of the invention to provide a flexible laminated sheet flooring product which includes a pre-applied, pressure sensitive tacky adhesive having sufficient tack to bond the flooring product to the subfloor.

It is another object of the invention to provide a flooring product which can be removed from the subfloor after installation without adhesive adhering to the subfloor and without damaging the flooring product.

It is another object of the invention to provide a flooring product which can be rebonded to the subfloor without the use of additional adhesives after being removed from the subfloor.

It is another object of the invention to provide a flooring product which is quickly and easily installed.

It is another object of the invention to provide a flooring product which includes a compressible and stretchable protective covering which releasably overlies the adhesive coating.

It is another object of the invention to provide a flooring product which does not require the application of a wet adhesive to the subfloor prior to installation.

It is another object of the invention to provide a flooring product which utilizes a predetermined amount of adhesive for bonding the product to the subfloor.

It is another object of the invention to provide a flooring product including a pre-applied adhesive coating which is releasable from a protective covering prior to installation.

These and other objects of the present invention are achieved in the preferred embodiments disclosed below by providing a flexible laminated sheet flooring product for covering a subfloor. The flooring product includes a resilient top layer defining a wearing surface of the flooring product. A fiber backing is laminated to the top layer for dimensionally supporting the layer. A pressure sensitive adhesive coating is permanently applied to the fiber backing and releasable from a protective covering without separation of the fiber backing from the top layer. The coating has sufficient tack for releasably adhering the flooring product to the subfloor.

According to one preferred embodiment of the invention, the top layer is sheet vinyl.

According to another preferred embodiment of the invention, the fiber backing is formed of felt.

According to yet another preferred embodiment of the invention, the strength of the bond formed between the fiber backing and subfloor is less than that formed between the fiber backing and top layer such that the flooring product is readily removable and replaceable over the subfloor.

According to yet another preferred embodiment of the invention, when the flooring product is in roll form or folded for storage and transport, a portion of the top layer overlying the adhesive coating forms the protective covering for the adhesive coating.

According to yet another preferred embodiment of the invention, the protective covering is a stretchable and compressible thermoplastic film.

Preferably, the film is polyethylene film.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 1 is a perspective view of a flexible laminated sheet flooring product according to one preferred embodiment of the invention;

FIG. 2 is an enlarged cross-sectional view of the flooring product;

DESCRIPTION OF THE PREFERRED EMBODIMENT AND BEST MODE

Figure 3:
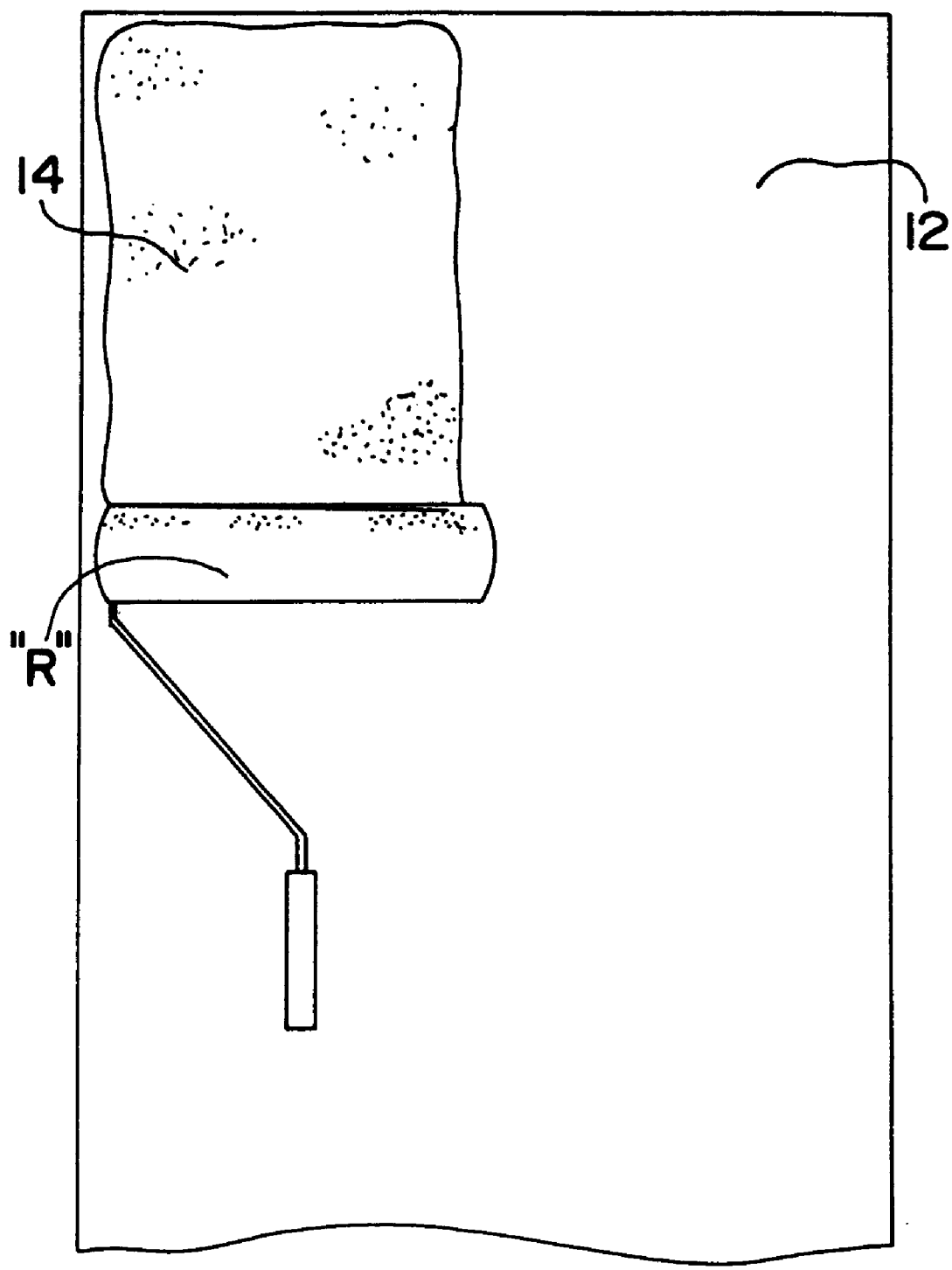
FIG. 3 is a view of the flooring product during the process of being coated with an adhesive.

Referring now specifically to the drawings, a flexible laminated sheet flooring product according to the present invention is illustrated in FIG. 1 and shown generally at reference numeral 10. The flooring product 10 is intended for ready and convenient application to a subfloor, and is particularly suited for use in areas of the home such as the kitchen and bathrooms. The flooring product 10 is adhereable to a variety of surfaces, such as plywood, concrete, and existing vinyl flooring. Installation requires little time and skill, and no special tools or equipment.

As shown in FIGS. 1 and 2, the flooring product 10 includes a top layer 11 defining a wearing surface 11A, and a felt backing 12 laminated to the underside of the top layer 11 for dimensional stability. The top layer 11 is preferably formed of a resilient, wear-resistant material such as sheet vinyl. The felt backing 12 is applied to the vinyl layer 11 during manufacture according to any conventional method known in this industry. Examples of felt-backed laminated floor coverings are described in U.S. Pat. Nos. 2,696,447, 2,705,683, and 2,739,082 issued to Armstrong Cork Company. The complete disclosure of these patents is incorporated herein by reference.

After lamination of the felt backing 12 and vinyl layer 11, a liquid adhesive 14 is coated onto the felt backing 12 using, for example, a conventional foam roller "R" as shown in FIG. 3. The adhesive 14 is absorbed by the felt backing 12 and air dried for about 5–20 min. to evaporate moisture and create a permanent tacking condition. The resulting "dry" adhesive 14 is pressure sensitive and has sufficient tack to hold the flooring product 10 to the subfloor, but will not cause delamination of the felt backing 12 and vinyl layer 11 when the flooring product 10 is removed from the subfloor for repositioning or replacement. Moreover, the properties of the adhesive 14 allow the flooring product 10 to be rolled or folded for storage and transport, and later unrolled or unfolded during installation without impairing the bond between the felt backing 12 and vinyl layer 11. In this case, the portions of the wearing surface 11A overlying the adhesive 14 act as a protective covering during handling of the flooring product 10 prior to installation.

According to one method, the flooring product 10 is installed by unrolling a length of product 10 directly over the subfloor, and then cutting this length from the roll and to the dimensions required to fit the particular floor area. Light pressure is then applied uniformly over the wearing surface 11A to adhere the flooring product 10 to the subfloor.

The adhesive 14 is preferably formulated as a water dispersion of polymeric material. In one example, the adhesive 14 includes the following ingredients with percentages given by weight of the overall composition:

97.32% of an aqueous dispersion of acrylic copolymer containing carboxyl groups;

1.60% polyacrylate solution;

0.71% neutralizing agents;

0.17% biocide;

0.15% green pigment dispersion; and 0.05% silica organic defoamer.

Preferably, the liquid adhesive 14 is applied to the flooring product 10 during manufacture at a rate of about 12–28 square yards per wet quart. The bonding strength of the adhesive 14 is weaker than the strength of the bond between the felt backing 12 and the vinyl layer 11. This allows the flooring product 10 to be removed from the subfloor, repositioned, and rebonded without separating the backing 12 from the layer 11.

Figure 4:
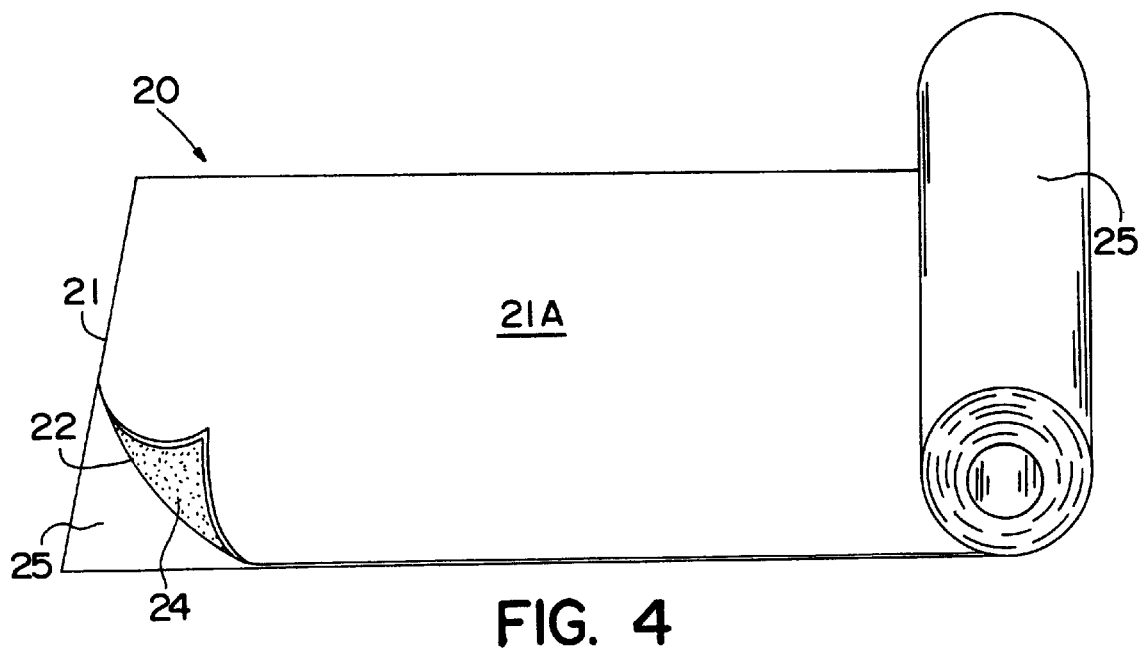
FIG. 4 is a perspective view of the flooring product according to a second preferred embodiment of the invention.
Figure 5:
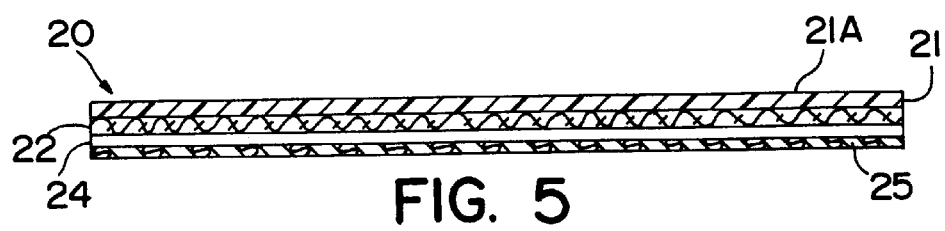
FIG. 5 is an enlarged cross-sectional view of the flooring product shown in FIG. 4.

A second embodiment of a flooring product according to the invention is shown in FIGS. 4 and 5. The flooring product 20 includes a vinyl layer 21 defining a wearing surface 21A, and a felt backing 22 laminated to the underside of the vinyl layer 21 for dimensional stability. After lamination, a liquid adhesive 24 is coated onto and absorbed by the felt backing 22. The adhesive 24 is then dried to evaporate moisture and create a permanent tacking condition on the back side of the flooring product 20, as described above. One or more removable sheets 25 of protective covering are then applied over the adhesive coating 24, and the flooring product 20 rolled up or folded for storage prior to installation. The protective covering 25 is preferably a thin sheet of stretchable and compressible polyethylene film about 2 mil thick.

The flooring product 20 of this embodiment is installed by first unrolling and cutting a desired length of flooring product from the roll, then removing the protective covering 25 from the felt backing 22 to expose the adhesive 24, then positioning the cut length of flooring product 20 over the subfloor, and then applying light pressure uniformly over the wearing surface 21A to adhere the flooring product 20 to the subfloor.

A flexible laminated sheet flooring product is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A preassembled, flexible laminated sheet flooring product for being installed on and covering a subfloor, comprising:

(a) a resilient, vinyl top layer defining a wearing surface of the flooring product;

(b) a fiber backing laminated to said top layer; and (c) a pressure sensitive adhesive applied to said fiber backing on a surface of the flooring product opposite the wearing surface, and said adhesive having sufficient tack for adhering the flooring product to the subfloor such that the flooring product is readily removable and repositionable over the subfloor during installation without substantial delamination of said adhesive from said fiber backing.

2. A flooring product according to claim 1, wherein said top layer comprises vinyl.

3. A flooring product according to claim 1, wherein said fiber backing comprises felt.

4. A flooring product according to claim 1, wherein the strength of the bond formed between the fiber backing and subfloor is less than that formed between the fiber backing and top layer such that the flooring product is readily removable and repositionable over the subfloor during installation.

5. A flooring product according to claim 1, and comprising a removable protective covering overlying said adhesive for protecting said adhesive prior to installation of the flooring product on the subfloor.

6. A flooring product according to claim 5, wherein the protective covering comprises a releasable thermoplastic film.

7. A flooring product according to claim 6, wherein the thermoplastic film comprises polyethylene film.

8. A preassembled, flexible laminated sheet flooring product for being installed on and covering a subfloor, comprising:

(a) a resilient, vinyl top layer defining a wearing surface of the flooring product;

(b) a felt backing laminated to said vinyl layer; and (c) a pressure sensitive adhesive applied to said felt backing on a surface of the flooring product opposite the wearing surface and having sufficient tack for adhering the flooring product to the subfloor, such that the flooring product is readily removable and repositionable over the subfloor during installation without substantial delamination of said adhesive from said felt backing.

\* \* \* \* \*